May 12, 1964    W. A. PAULSSEN    3,132,722
WHEEL CHOCK LOCKING DEVICE FOR RAIL VEHICLES
Filed Sept. 20, 1962    3 Sheets-Sheet 1

INVENTOR
WALTER A. PAULSSEN
BY M. W. Goodwin
ATTORNEY

May 12, 1964 W. A. PAULSSEN 3,132,722
WHEEL CHOCK LOCKING DEVICE FOR RAIL VEHICLES
Filed Sept. 20, 1962 3 Sheets-Sheet 3

INVENTOR.
WALTER A. PAULSSEN
BY
ATTORNEY

United States Patent Office 3,132,722
Patented May 12, 1964

3,132,722
WHEEL CHOCK LOCKING DEVICE FOR
RAIL VEHICLES
Walter A. Paulssen, Ottawa County, Mich., assignor to
Manning, Maxwell & Moore, Incorporated, Stratford,
Conn., a corporation of New Jersey
Filed Sept. 20, 1962, Ser. No. 224,967
14 Claims. (Cl. 188—36)

This invention relates to material handling equipment and more particularly, to novel and improved means for locking, in selected positions, a rail mounted wheeled vehicle.

The present invention finds particular application in bridge cranes. Bridge cranes, which are well known, generally comprise a structural steel structure, referred to as a bridge, which is mounted, by means of wheels, for movement along rails or tracks extending along a supporting structure. The bridge may likewise have rails or tracks mounted thereon with a wheeled trolley being mounted for movement on the rails. The trolley is movable relative to the bridge at right angles to the direction of movement of the bridge. The trolley is adapted to carry material handling equipment which often comprises means for lifting material at one location and for lowering the material at a second location after relocation of the bridge and trolley. In some applications of a bridge crane, it is necessary to provide accurate positioning of the bridge and trolley during a portion of the material handling operation. In such applications, it is often equally important to assure that the bridge and trolley do not move from their intended positions during a portion of the material handling operation.

Accordingly, it is the primary object of this invention to provide novel and improved means for locking a rail mounted wheeled vehicle, such as a crane bridge or trolley, in a selected position along the rails.

Another object of this invention is to provide a locking means as described which is power controlled and adapted for remote operation and which may be manually released in the event of failure of the power control while the device is in a locking condition.

It is a further object of this invention to provide a locking means as described which may be manually operated in the event of failure of control power.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
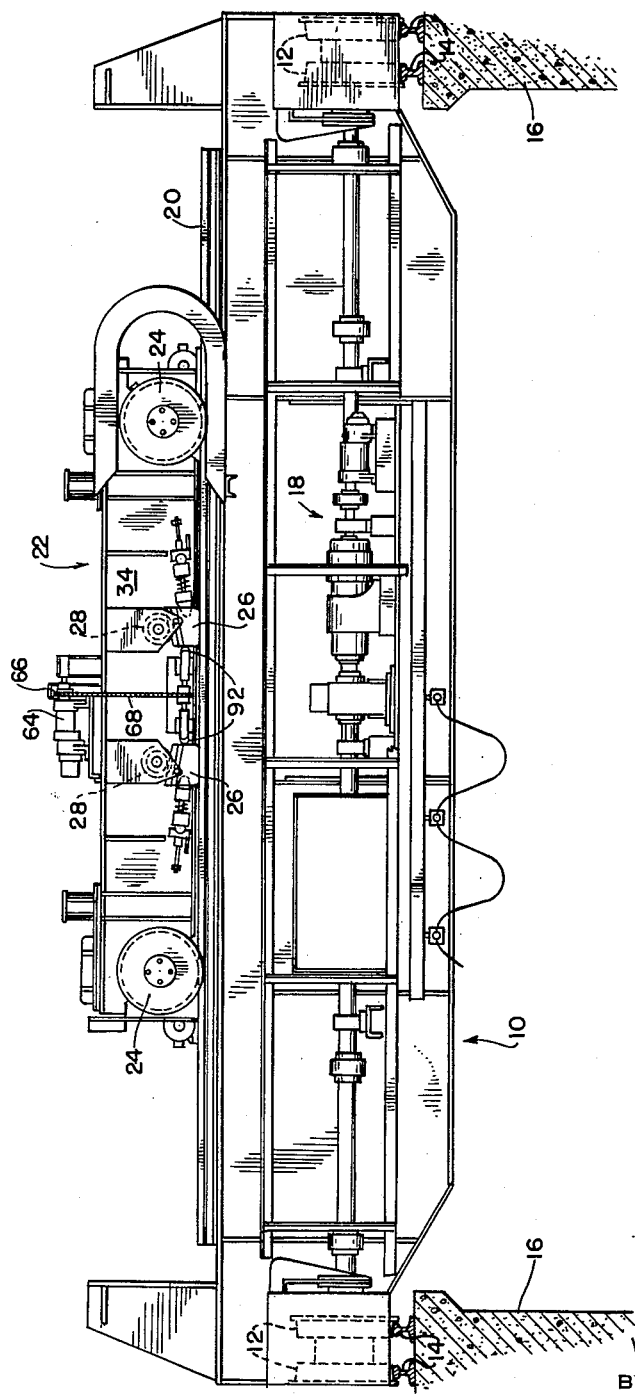
FIG. 1 is an end elevational view of a bridge crane incorporating the locking means of this invention.

With reference to the drawings and particularly FIG. 1 thereof, there is shown an exemplary bridge crane with which the present invention is adapted for use. The crane comprises a structural steel bridge generally indicated at 10. The bridge includes, at each end thereof, wheels 12 which ride on rails or tracks 14 mounted on a supporting structure 16 whereby the bridge is elevated above a working area and is movable over the working area in a direction longitudinally of the rails 14. The wheels 12 are driven by suitable drive means generally indicated at 18. Such drive means may include an electric motor connected to the wheels through suitable reduction gearing and associated mechanisms. The bridge has mounted thereon a pair of spaced parallel rails 20 (only one of which is shown). The rails 20 are mounted on the top of the bridge and extend at right angles to the rails 14. Mounted for movement along the rails 20 is a trolley generally indicated at 22. The trolley is mounted on the rails by means of wheels 24 whereby the trolley is movable longitudinally of the rails 20 and thus relative to the bridge at right angles to the direction of bridge movement. The wheels 24 of the trolley are connected to suitable drive means (not shown) which may be an electric motor and reduction gear drive similar to the bridge drive unit. The trolley is adapted to carry equipment such as a hoisting device (not shown) having work engageable means which may be extended downwardly from the trolley into the work area below the bridge. The crane as described is generally well known and provides a device whereby material may be repositioned within the work area beneath the crane and within the confines of the limits of movement of the bridge and trolley.

In accordance with this invention, means are provided for locking the bridge and trolley in selected positions along their paths of travel. In the interest of brevity, only the locking means associated with the trolley 22 are shown and will be hereinafter described, it being understood that substantially identical means may be provided in association with the bridge.

Figure 2:
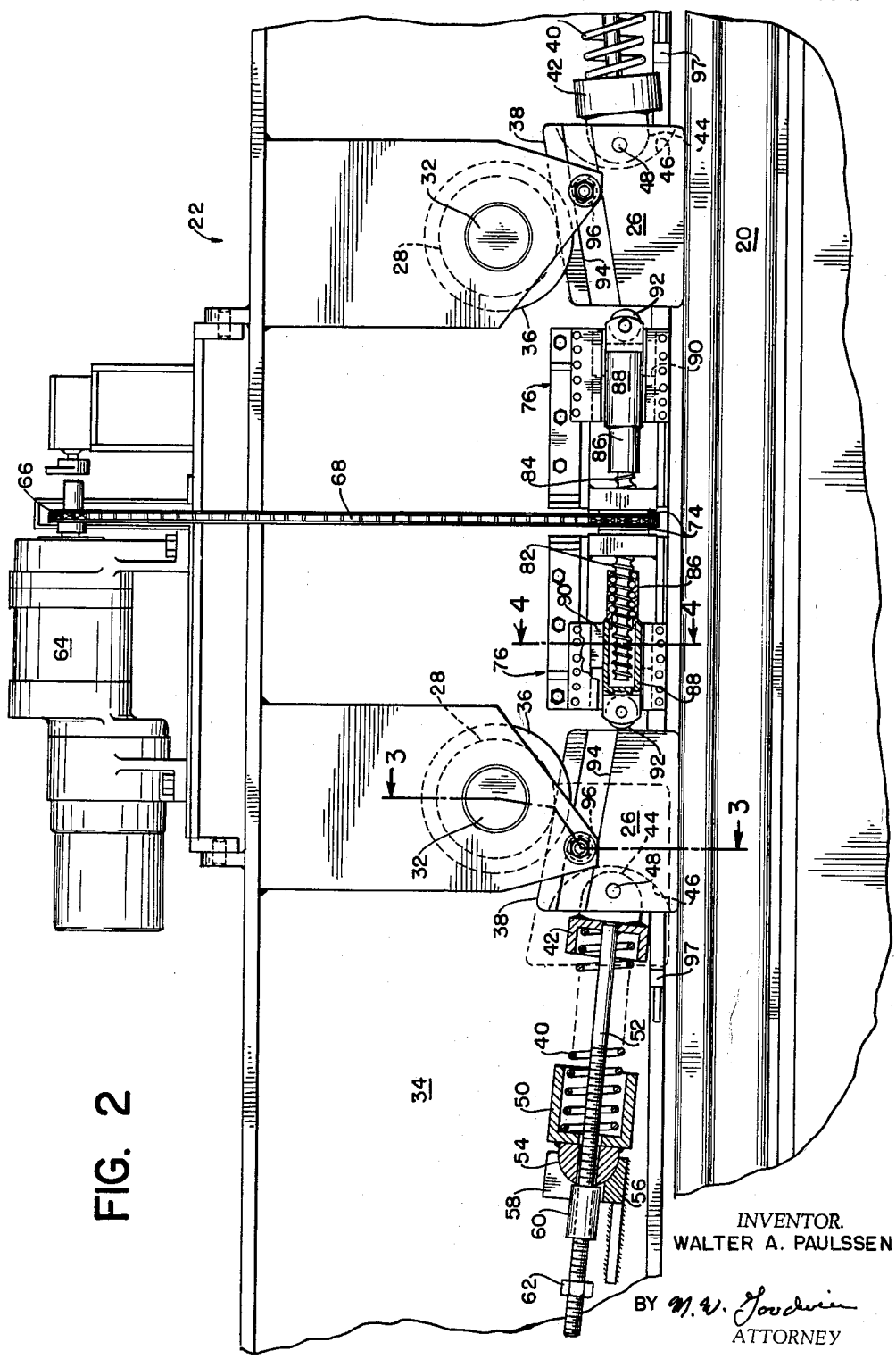
FIG. 2 is an enlarged fragmentary side elevational view of the trolley of the crane of FIG. 1 showing the locking means of this invention in greater detail.
Figure 3:
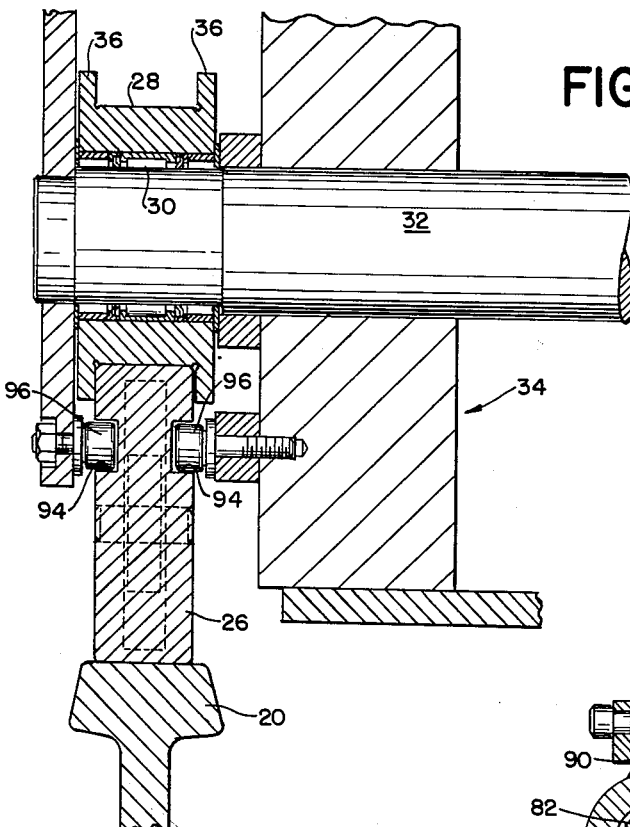
FIG. 3 is an enlarged cross-sectional view substantially along the line 3—3 of FIG. 2.

With reference to FIGS. 1 to 3, the locking means of this invention comprises a pair of aligned locking wedges or blocks 26 which are disposed on each side of the trolley and which are engageable between the top surface of the rails 20 and rollers 28 on the trolley. As shown in FIG. 3, each roller 28 is journalled by a bearing 30 on a shaft 32 suitably fixed to a portion of the frame 34 of the trolley. Each roller 28 has radially directed flanges 36 at its opposite ends and between which the associated wedge 26 is received. As clearly shown in FIG. 2, each wedge 26 has a flat bottom surface extending parallel to the top surface of the rail 20 and an inclined top surface 38 extending angularly of the rail 20. The inclined top surface 38 of the wedge is engageable with the roller 28 whereby when the wedge is moved in one direction generally parallel to the general plane of the rail 20, the roller 28 will cam the wedge downwardly and into firm engagement with the rail 20; thus, locking the trolley relative to the rail.

The mechanism for moving the wedges 26 into and out of locking position will now be described in connection with the leftward wedge shown in FIG. 2. It will be understood that a similar mechanism is employed in connection with the other wedge shown in FIG. 2. The wedge 26 is biased toward the full line locking position shown in FIG. 2 by a preloaded coil compression spring 40 extending generally in the direction of movement of the wedge. The rightward end of the spring 40, as viewed in FIG. 2, is contained within a cup-shaped end cap or retainer 42. The retainer 42 has integrally mounted therewith a projection 44 which extends into an arcuate cutout 46 in the next adjacent end of the wedge 26. The spring retainer projection 44 is pivoted, as at 48, on the wedge. The other end of the spring 40 is received within a second cup-shaped end cap or retainer 50. A rod 52 extends co-axially through the spring 40. One end of the rod is received within an aperture in the spring retainer 42 and is fixed, as by welding, to the retainer. The other end of the rod extends through an aperture in the end wall of the spring retainer 50, in radially spaced relation to the bordering edge portion of the aperture, and outwardly beyond the retainer 50. The retainer 50 integrally mounts on the outer surface of its end wall a male swivel joint member 54 which is provided with an aperture loosely receiving the rod 52. The joint member 54 is of parti-cylindrical configuration; more specifically, it is an elongated member having an arcuate cross-section which is somewhat greater than semi-circular. The joint member 54 is pivotally engaged within a generally semi-cylindrical cross-sectioned recess in a socket member 56 which is fixed to the frame of the trolley, such as by welding. The socket member 56 is provided with a slot 58 extending downwardly from the top surface of the socket member and intersecting the arcuate recess in which the joint member 54 is seated. As shown, in FIG. 2, the slot 58 terminates short of the bottom of the semi-cylindrical recess in the socket 56. A cylindrical bushing 60, slidably mounted on the rod 52, is partially received within the slot 58 in closely spaced relation relative to the sides of the slot. As shown in FIG. 2, the outer end portion of the rod 52 is threaded, and a spring pre-load nut 62 is threadably engaged with the rod outwardly of the bushing 60.

As will be apparent from FIG. 2, the spring 40 urges the wedge 26 to the right, as viewed in FIG. 2, and toward the full line locking position of the wedge. In initially assembling the wedge and spring assembly, the pre-load nut 62 is threaded into engagement with the bushing 60, and continued inward threading of the nut serves to compress the spring 40 sufficiently that the wedge may be positioned in engagement with the roller 28 and the joint member 54 may be located in registry with the semi-cylindrical recess in the socket member 58. The pre-load nut 62 is then backed off to permit the joint member 54 to seat in the socket member 58. When the spring and wedge assembly is assembled, as shown in FIG. 2, the spring 40 will be compressed an amount sufficient to assure that when the wedge is in the full line locking position of FIG. 2, it will be cammed into engagement with the rail 20 with a force sufficient to provide the desired locking. The pivotal mounting of both ends of the spring on the wedge and trolley frame, respectively, assures proper engagement of the wedge between the roller 28 and top surface of the rail 20.

Figure 5:
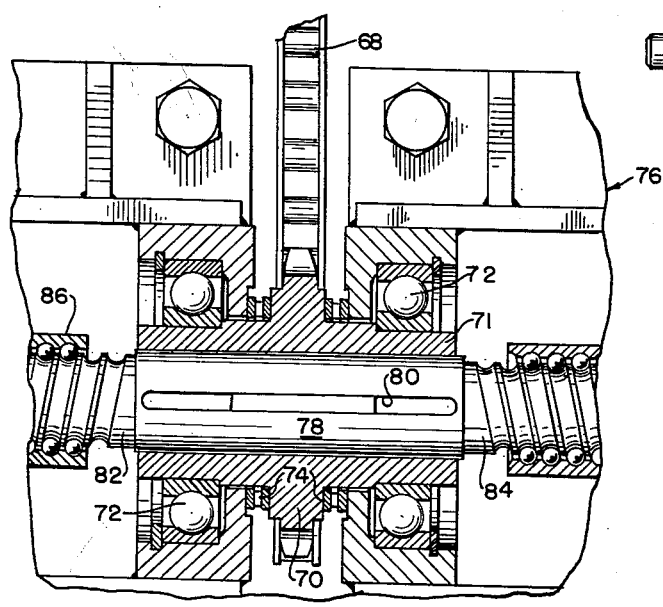

Further, in accordance with this invention, means are provided to control the positioning of the wedges between the full line locking position of FIG. 2 and the broken line release position. More specifically, and as shown in FIGS. 1 and 2, an electric drive motor 64 is mounted on the frame of the trolley 22. As more clearly shown in FIG. 2, the motor drives a sprocket 66 which in turn drives a roller chain 68 also drivingly connected to a second sprocket 70. As best shown in FIG. 5, the sprocket 70 has an elongated hub 71 and is journalled by ball bearings 72 and thrust bearings 74 on a bracket generally indicated at 76. The bracket 76 is suitably fixed to the frame of the trolley 22. The hub 71 of the sprocket has an axial bore in which is slidably received the shank 78 of a double ended jack screw. The shank 78 is provided with a pair of diametrically opposed keys 80 slidably received in recesses or grooves in the wall of the axial bore of the sprocket 71 whereby rotation of the sprocket 70 will effect corresponding rotation of the jack screw shank 78 while permitting axial movement of the jack screw shank relative to the sprocket hub.

Figure 4:
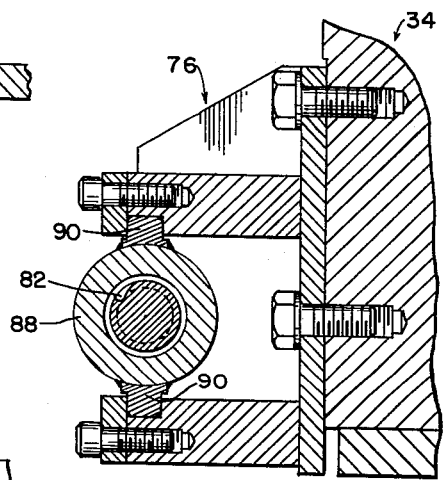
FIG. 4 is an enlarged cross-sectional view substantially along the line 4—4 of FIG. 2; and, FIG. 5 is an enlarged fragmentary cross-sectional view of a portion of the locking means of FIG. 2.

The jack screw of the embodiment shown is a ball screw having two helically grooved portions 82 and 84 extending co-axially of and in opposite directions from the shank 78. As is clearly seen in FIG. 5, the helical grooves in the ball screw portions 82 and 84 are of opposite hand for a reason which will be apparent hereinafter. The ball screw portion 82 is received within a jack screw nut, or more specifically a ball nut 86, which, as shown in FIG. 2, has an integrally mounted extension 88 extending co-axially from the outer end thereof. The extension 88 is generally cylindrical and is closed at its outer end. The ball nut extension 88 receives the outer end of the ball screw 82 in radially spaced relation and has a pair of diametrically opposed guides or keys 90 extending longitudinally of and radially outwardly of the extension. As shown in FIG. 4, the guides 90 are received within grooves or channels provided in the mounting bracket 76 whereby as the ball screw 82 is rotated, the ball screw nut 86 and nut extension 88 will be moved longitudinally of the guides 90 in a direction toward or away from the next adjacent end of the wedge 26 and in a direction parallel to the track 20. As shown in FIG. 2, the outer end of the nut extension 88 carries a roller 92 which is engageable with the next adjacent end of the wedge 26. Accordingly, as the sprocket 70 is driven in one direction, the roller 92 will be moved into engagement with the wedge. Continued rotation of the sprocket in the same direction will cause the roller 92 to move the wedge into the broken line release position shown in FIG. 2, whereby the wedge is no longer engaged between the roller 28 and rail 20. Subsequent rotation of the sprocket 70 in the opposite direction will effect retraction of the roller 92 and thus permit the spring 40 to return the wedge toward its full line locking position of FIG. 2.

It will be further noted in FIGS. 2 and 3 that the wedge 26 is provided with a pair of cam grooves or channels 94 on the opposite sides thereof and extending parallel to the inclined top surface 38 of the wedge. Received within these grooves are a pair of cam rollers 96 which are rotatably supported on the frame 34 of the trolley. Accordingly, as the wedge 26 is moved to the left, as viewed in FIG. 2, the cam rollers 96 will cause the wedge to be lifted vertically relative to the track 20; thus, disengaging the wedge from the track while retaining the upper surface of the wedge in rolling contact with the roller 28. While the cam rollers 96 will, at least to some extent, tend to move the wedge downwardly toward the rail 20 as the wedge is moved from its broken line release position of FIG. 2 toward the full line locking position, it is the engagement between the wedge and roller 28 which is primarily relied upon to effect firm locking arrangement between the wedge and the rail 20.

While only the ball screw and associated mechanism concerned with the leftward wedge 26 of FIG. 2 has been described in detail, it will be understood substantially identical mechanism is associated with the other wedge 26.

In the operation of the locking device as hereinabove described, when the rollers 92 are retracted the springs 40 will urge the wedges 26 into engagement between the rolls 28 and rail 20. When it is desired to free the wedges the motor 64 is energized to drive the ball screw 82 and advance the rollers 92 into engagement with the wedges. When the pair of wedges shown in FIG. 2, are in locked position there may be unequal wedging forces exerted on the wedges. This can occur because of different frictional forces at the wedges due to unequal load distribution on the trolley thus resulting in a greater load on one wedge than another, or the rails 20 might be slightly inclined longitudinally of themselves thus resulting in one of the rolls 28 exerting a greater load on its associated wedge than is the case of the other roll. In most cases the differences in loading of opposite wedges on the same side of the trolley has been found to be relatively small. However, this difference is sufficient that during advance of the ball screw nut rollers 92, the lesser loaded wedge will be disengaged from between the rail and associated roll 28 prior to the disengagement of the heavier loaded wedge on the same side of the trolley. After the first wedge has been disengaged, the slip fit or axial floating of the ball screw shank 78 in the sprocket hub 71 will permit the ball screw to move in the direction of the freed wedge. During this sliding movement of the ball screw the other engaged wedge will still be in locking engagement between the roller 28 and rail 20. However, after movement of the disengaged wedge a short distance, it will engage a stop 97 fixed to the frame of the trolley whereupon the full power of the ball screw is then transferred to the remaining locked wedge until that wedge is likewise freed. By this manner of operation it will be seen that when the pair of wedges associated with a ball screw 82 are unequally loaded the wedges will be disengaged one at a time in a sequence depending upon which wedge is more lightly loaded. An advantageous result is that the drive means for the ball screw is required to provide power sufficient only to move one wedge at a time thus reducing the power requirement with an attendant reduction in size and cost of installation. Likewise the ball screw mechanism size may be kept to that required for exerting sufficient force to disengage only one wedge at a time.

When it is desired to re-engage the wedges the ball screw mechanism is actuated to retract the rolls 92 whereupon the springs 40 will urge the wedges into engagement between the rolls 28 and rail 20, whereupon the trolley will again be locked relative to the rail.

It will be understood that the locking mechanism on the side of the trolley not shown in FIG. 1 is identical with that described above and that a substantially identical mechanism may be provided on the sides of the bridge. The power mechanism for controlling the locking means may be actuated by a suitable switching arrangement either on the bridge or trolley or, if desired, actuation may be provided from a remote location by means of flexible cables (not shown) connecting the motor 64 to a fixed control station or one which is movable with the trolley. Should the power control mechanism for positioning the wedges fail, while the wedges are in locking position, the wedges may be manually disengaged. To this end, the nut 62, will be threaded inwardly into engagement with the bushing 60. Further inward threading of the nut 62 will cause the male joint member 54 to be moved out of seating engagement with the recess in the socket member 56. Once the joint member 54 has cleared the socket member 56, the rod 52 along with the bushing 60 may be lifted vertically out of the slot 58, and the wedges may be manually moved out of latched position. While perhaps somewhat inconvenient, as compared to the power control of the wedges previously described, in the event of a power failure, the wedges may be repositioned in locking engagement with the rails by reinserting the rod 52 and bushing 60 in the socket member 56 and then backing off the nut 62 in a procedure reversed from that whereby the wedges were manually disengaged.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims in intended to cover all of the generic and specific features of the invention herein described and all statements of the scope of the invention which, as a matter of language, might be said to fall therebetween.

I claim:

1. In material handling equipment of the type including a wheeled component mounted on a rail for movement longitudinally of the rail, the component having a frame, a locking wedge carried on said frame and mounted for movement relative thereto and in directions generally parallel to the general plane of said rail, said wedge being engageable with said rail to lock said component relative to the rail, means mounted on said frame and cooperably engageable with said wedge to move the same toward said rail in response to movement of the wedge in one direction generally parallel to said general plane, a preloaded spring urging said wedge in one direction generally parallel to said general plane, drive means for moving said wedge in a direction opposing said spring, and means independent of said drive means for manually releasing said wedge.

2. In material handling equipment of the type including a wheeled component mounted on a rail for movement longitudinally of the rail, the component having a frame, a locking wedge carried on said frame and mounted for movement relative thereto and in directions generally parallel to the general plane of said rail, said wedge being engageable with said rail to lock said component relative to the rail, means on said frame cooperably engageable with said wedge to move the same toward said rail in response to movement of the wedge in one direction, cam means for moving the wedge away from said rail in response to movement of the wedge in a direction generally opposite to said one direction, spring means urging said wedge in one said direction, and means for moving said wedge in a direction opposite said one direction.

3. In material handling equipment of the type including a wheeled component mounted on a rail for movement longitudinally of the rail, the component having a frame, a wedge carried on said frame and mounted for movement relative thereto and generally parallel to the general plane of said rail, said wedge having a bottom surface engageable with the top surface of said rail and having an inclined top surface, a roller mounted on said frame and cooperably engageable with the top surface of the wedge to move the same toward the rail in response to movement of the wedge in one direction generally parallel to said general plane, a preloaded spring urging said wedge in said one direction, power driven means for moving said wedge in a direction generally opposite said one direction, and manually operable means independent of said power driven means for compressing said spring to release said wedge in the event of failure of said power driven means.

4. In material handling equipment of the type including a wheeled component mounted on a rail for movement longitudinally of the rail, the component having a frame, a wedge mounted for movement generally parallel to the general plane of said rail, said wedge having a bottom surface engageable with the top surface of said rail and having an inclined top surface, a roller mounted on said frame and engageable with the top surface of the wedge to move the wedge toward said rail in response to movement of the wedge in one direction generally parallel to said general plane, said wedge having on a side thereof a cam groove extending parallel to the top surface of the wedge, a cam roller received in said cam groove and mounted on said frame, spring means urging said wedge in said one direction, and means for moving said wedge in a direction opposing said spring means.

5. In material handling equipment of the type including a wheeled component mounted on a rail for movement longitudinally of the rail, the component having a frame, a locking wedge carried on said frame and movable in directions generally parallel to the general plane of said rail, said wedge being engageable with said rail to lock the component relative to said rail, means on said frame cooperably engageable with said wedge to move the same toward said rail in response to movement of the wedge in one direction generally parallel to said general plane, spring means including a preloaded compression spring urging said wedge in said one direction, means pivotally mounting one end of said spring means on said wedge, pivot means mounting the other end of said spring means on the frame, said pivot means comprising a male member seated in a socket member, one of said members being mounted on the frame, said spring means including means for compressing said spring sufficiently to unseat said male member and socket member, and means for moving said wedge in a direction opposite said one direction.

6. In material handling equipment of the type including a wheeled component mounted on a rail for movement longitudinally of the rail, the component having a frame, a wedge carried on said frame and movable generally parallel to the general plane of said rail, said wedge being engageable with said rail to lock said component relative to said rail, means on said frame cooperably engageable with the wedge to move the same toward the rail in response to movement of the wedge in one direction generally parallel to said general plane, spring means urging said wedge in said one direction and comprising a preloaded coil compression spring, means pivotally mounting one end of said spring on the wedge, a spring retainer receiving the other end of the spring, said retainer having a parti-cylindrical portion the axis of which extends parallel to the pivot axis of said one end of the spring, a socket member fixed to said frame and having an arcuate cross sectioned recess in which said parti-cylindrical portion is seated, a rod extending longitudinally through said spring and anchored at one end relative to said one end of said spring, the other end of said rod being disposed outwardly beyond said socket member, said socket member having a slot extending chordally of and intersecting said arcuate recess, said rod being received in said slot, means on said rod engageable with said parti-cylindrical portion for moving the same against the force of said spring and toward said one end of the spring sufficiently to permit removal of said parti-cylindrical portion from said socket member, and means for moving said wedge against the force of said spring.

7. In material handling equipment of the type including a wheeled component mounted on a rail for movement longitudinally of the rail, the component having a frame, a wedge extending parallel to said rail and having a bottom surface engageable with the top surface of said rail and having an inclined top surface, a roller mounted on said frame and engageable with the top surface of the wedge, said wedge having on each side thereof a cam groove extending parallel to the top surface of the wedge, a cam roller received in each cam groove and mounted on said frame, spring means urging said wedge in one direction along the rail, said spring means comprising a preloaded coil compression spring pivotally mounted at one end on the wedge and at the other end on the frame, and motor driven means on the frame engageable with the wedge to move the same in a direction opposite said one direction.

8. In material handling equipment of the type including a wheeled component mounted on a rail for movement longitudinally of the rail, the component having a frame, a pair of aligned wedges extending parallel to said rail and movable longitudinally thereof, each wedge having a bottom surface engageable with the top surface of said rail and having an inclined top surface, a pair of rolls mounted on said frame and engageable respectively with the top surfaces of the wedges, the top surface of said wedges being directed toward each other and said rail, each wedge having on a side thereof a cam groove extending parallel to the top surface of the wedge, a cam roller received in each cam groove and mounted on said frame, spring means urging each wedge toward the other wedge into wedging engagement between said rail and the associated roll and means for moving said wedges in a direction to separate the same.

9. In material handling equipment as described in claim 8, the last mentioned means, including means providing sequential disengagement of the said wedges from between said rail and rolls.

10. In material handling equipment of the type including a wheeled component mounted on a rail for movement longitudinally of the rail, the component having a frame, a pair of aligned wedges extending parallel to said rail and movable longitudinally thereof each wedge having a bottom surface engageable with the top surface of said rail and having an inclined top surface, a pair of rolls mounted on said frame and engageable respectively with the top surfaces of the wedges, the top surface of said wedges being directed toward each other and said rail, each wedge having on a side thereof a cam groove extending parallel to the top surface of the wedge, a cam roller received in each cam groove and mounted on said frame, spring means urging each wedge toward the other wedge and into wedging engagement between said rail and the associated roll, a stop limiting movement of each wedge in a direction away from the other wedge, and means for separating said wedges to disengage the same from between the rail and rolls including a jack screw for exerting a force on both of said wedges simultaneously, said jack screw being mounted for rotation and for movement in the direction of its rotational axis.

11. In material handling equipment of the type including a wheeled component mounted on a rail for movement longitudinally of the rail, the component having a frame, a pair of aligned wedges extending parallel to said rail and each having a bottom surface engageable with the top surface of said rail and having an inclined top surface, a pair of rollers mounted on said frame and engageable respectively with the top surfaces of the wedges, the top surface of said wedges being directed toward each other and said rail, each wedge having on a side thereof a cam groove extending parallel to the top surface of the wedge, a cam roller received in each cam groove and mounted on said frame, spring means urging each wedge toward the other wedge, a double ended jack screw disposed between said wedges, said screw having an intermediate shank portion, a rotatable drive member mounted on said frame and having an axial bore in which said shank portion is slidably received for rotation therewith, a jack screw nut associated with each end of the jack screw and having means engageable with means on the frame to prevent rotation of the nut, a roller mounted for movement with each nut and engageable with a next adjacent wedge to move the same in a direction opposite the force of said spring, and a stop associated with each wedge and mounted on said frame in relation to the wedge to provide a limit of movement thereof in the direction of movement of the wedge by said jack screw.

12. In material handling equipment of the type including a wheeled component mounted on a rail for movement longitudinally of the rail, the component having a frame, a pair of wedges mounted for movement with the frame and relative thereto, said wedges being engageable between said rail and means on the frame thereby to lock said component relative to the rail, means for moving the wedges toward locking engagement, and common drive means for moving said wedges out of locking engagement including means to provide sequential disengagement of said wedges when one wedge is more firmly lockingly engaged than the other.

13. In material handling equipment of the type including a wheeled component mounted on a rail for movement longitudinally of the rail, the component having a frame, a pair of wedges mounted for movement with the frame and relative thereto, said wedges being engageable between said rail and means on the frame thereby to lock said component relative to the rail, means for moving said wedges toward locking engagement, a stop limiting movement of each wedge in the direction of movement thereof corresponding to locking disengagement, and common drive means constructed and arranged to act simultaneously on both wedges to exert a force thereon in a direction corresponding to disengagement movement of the wedges, said drive means including force transmitting means in driving connection with both wedges and shiftable in a direction corresponding to disengaging movement of one wedge in response to disengagement of said one wedge prior to disengagement of the other wedge thereby to effect the movement of said one wedge only until said one wedge engages the associated stop whereupon the full effect of the force output of said drive means is available for effecting disengagement of said other wedge accompanied by movement of the shiftable force transmitting means in the direction of disengaging movement of said other wedge.

14. In material handling equipment of the type including a wheeled component mounted on a rail for movement longitudinally of the rail, the component having a frame, a pair of aligned wedges mounted for movement with the frame and relative to the frame and rail, said wedges being engageable between said rail and means on the frame thereby to lock said component relative to the rail, means for moving the wedges toward each other and locking engagement, and common drive means for moving said wedges away from each other in a disengaging direction, said drive means including a double ended jack screw extending between the wedges for effecting application of a force on both wedges simultaneously, said jack screw being mounted for rotation and for movement in the direction of its axis of rotation, a pair of jack screw nuts on the ends of said jack screws nonrotatably associated with said frame and having means for engaging said wedges, and a stop fixed to said frame and associated with each wedge to limit movement of the wedge away from the other wedge, whereby when one wedge is disengaged prior to the other, said jack screw will be shifted toward said one wedge thereby effecting movement of said one wedge at a rate corresponding to the combined advances of said jack screw nuts until said one wedge engages its stop whereupon the full effective output of said jack screw will be applied to the other wedge to effect disengagement thereof and subsequent movement thereof with attendant shifting of said jack screw toward said other wedge.

References Cited in the file of this patent

FOREIGN PATENTS 16,264 of 1906    Great Britain _____ July 18, 1907